W. G. BEATTY.
TRANSMISSION GEAR.
APPLICATION FILED DEC. 13, 191

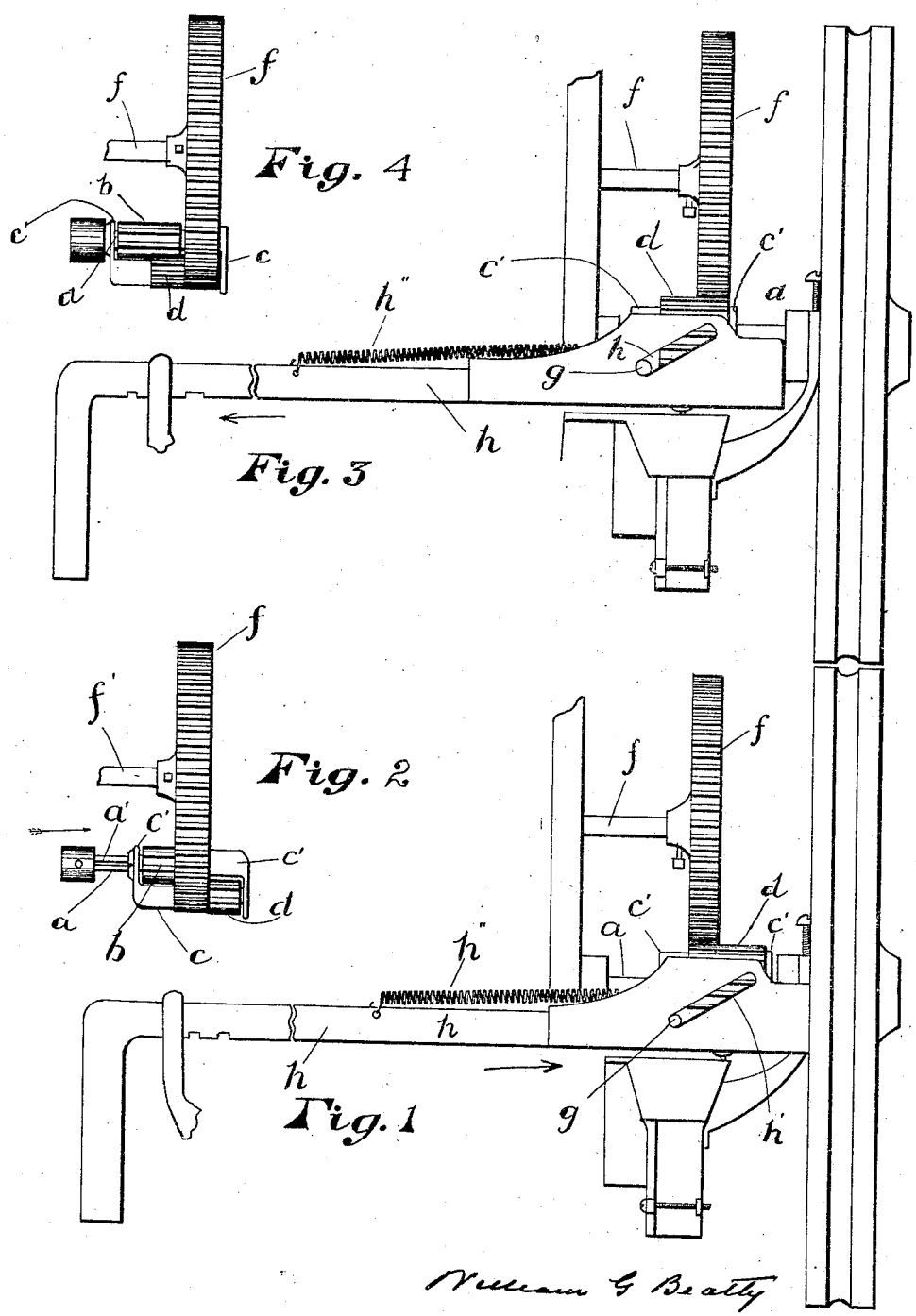

1,304,648.

Patented May 27, 1919.
2 SHEETS—SHEET 2.

William G Beatty
per Chas H Riches
attorney.

UNITED STATES PATENT OFFICE.

WILLIAM G. BEATTY, OF FERGUS, ONTARIO, CANADA.

TRANSMISSION-GEAR.

1,304,648.  Specification of Letters Patent. Patented May 27, 1919.

Application filed December 13, 1918. Serial No. 266,540.

*To all whom it may concern:*

Be it known that I, WILLIAM GEORGE BEATTY, of the town of Fergus, in the county of Wellington and Province of Ontario, Dominion of Canada, have invented certain new and useful Improvements in Transmission-Gears; and I hereby declare that the following is a full and exact description of same.

This invention relates to a transmission gear, comprising a spur wheel, a driving shaft, having a driving pinion rotatable therewith and axially movable thereon into and out of mesh with the spur wheel, a reversing pinion rotatably mounted in a pinion frame loosely journaled on said shaft and movable axially thereon with the driving pinion, the reversing pinion being continuously in mesh with the driving pinion and normally out of mesh with the spur wheel, and a shift lever for moving the pinion frame, the reversing pinion, and the driving pinion axially on said shaft to selectively bring the driving pinion into and out of mesh with the spur wheel, said shift lever having a cam for positioning the pinion frame to bring the reversing pinion into mesh with the spur wheel when the driving pinion and spur wheel are out of mesh, each of said pinions having faces twice the width of the spur wheel and in such position that only one half of the face of each pinion is engaged with the other, the pinion frame holding these pinions together in their correct relative position to each other and to the spur wheel, as hereinafter set forth and particularly pointed out in the claims.

In the drawings:

Figure 1, is an elevational view of the driving gear, showing the position of the parts when the driving pinion is in mesh with the driven spur wheel.

Fig. 2, is a plan view of the driven spur wheel and driving and reversing pinions in the position shown in Fig. 1.

Figure 7:
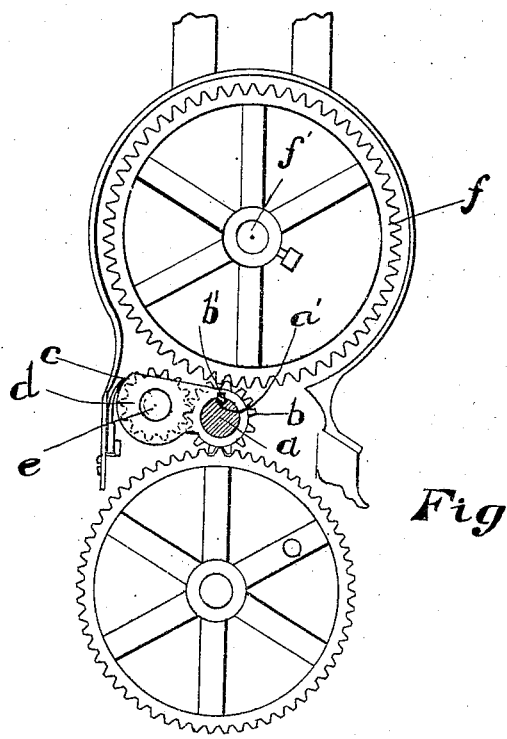
Figure 5:
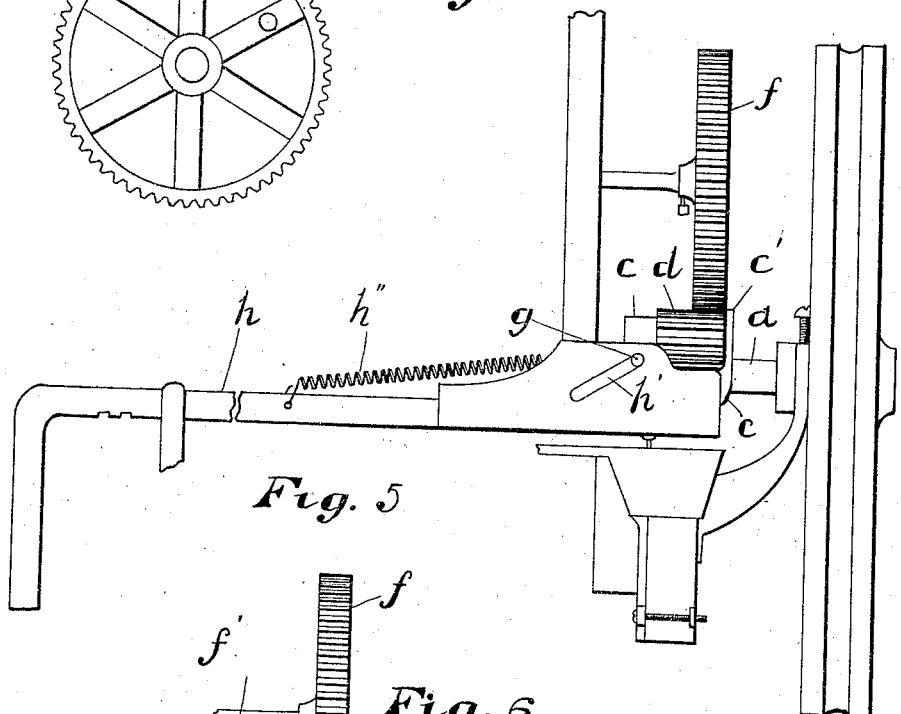
Figure 6:
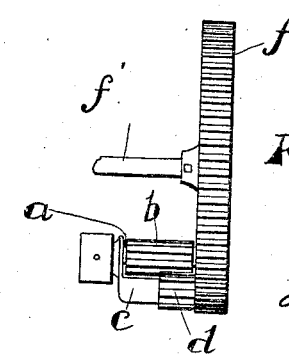

Fig. 3, is a similar view to Fig. 1, showing the position of the parts when the driving pinion is out of mesh with the driven spur wheel and the reversing pinion is in a neutral position, Fig. 4, is a plan view of the driven spur wheel and driving and reversing pinions when in position shown in Fig. 3, Fig. 5, is a similar view to Figs. 1 and 3, showing the position of the parts when the reversing pinion is in mesh with the driven spur wheel, Fig. 6, is a plan view of the driven spur wheel and the driving and reversing pinions when in position shown in Fig. 5, and Fig. 7, is a side elevational view showing two driven spur wheels and the driving and reversing pinions.

Like characters of reference refer to like parts throughout the specification and drawings.

$f$ represents the driven gear or spur wheel, $a$ represents the driving shaft, $a'$ represents an elongated keyway therein.

$b$ represents a driving pinion mounted to move axially on the driving pinion shaft and provided with a key $b'$ engaging in the keyway $a'$ to cause its united revolution with the driving shaft.

$c$ represents the pinion frame for the reversing pinion $d$, which is constantly in mesh with the driving pinion $b$, the pinion frame being provided with forked arms $c'$ loosely mounted on the driving shaft $a$, so that it may move axially, and rotate independently thereof, and journaled in the pinion frame $c$ is the reversing pinion shaft $e$ upon which the reversing pinion is loosely mounted. The faces of the driving and reversing pinions are each twice the width of the spur wheel $f$ and in such position that only one half of the face of each pinion is engaged with the other. The pinion frame $c$ holds these pinions in their correct relative position while together, they take up the different positions necessary to drive the spur wheel. As shown in Figs. 2, 4 and 6, the forked arms $c'$ of the pinion frame $c$ encircle the driving shaft $a$ on opposite sides of the driving pinion $b$, and cause the united movement of the driving pinion $b$, and reversing pinion $d$, when the pinion frame is moving in either direction.

$f$ represents the driven spur wheel mounted upon the spur wheel shaft $f'$, and having such relation to the driving and reversing pinions that either of these pinions may be selectively brought into mesh with the driven spur wheel, or both of them may be moved out of mesh.

$g$ represents a stud projecting from the bearing $c$.

$h$ represents a shift lever having a cam slot $h'$ to receive the stud $g$, and $h''$ represents a spring connected with the pinion frame and the lever $h$ to effect the united movement of the pinion frame and shift lever when the shift lever is actuated to move the driving pinion out of mesh with the driven spur wheel.

The driven spur wheel $f$ is fixed on the spur wheel shaft $f'$ and is continuously maintained in the same position, with relation to the driving shaft $a$, so that when the shift lever is pressed to its limit of movement, in the direction of the arrow, as shown in Figs. 1 and 2, the driving pinion $b$ will mesh with the driven spur wheel, and the motion of the driving shaft $a$ will be transmitted by means of the driving pinion $b$, and driven spur wheel $f$, to the driven spur wheel shaft $f'$.

When the driving pinion is in mesh with the driven spur wheel, the stud $g$ is at the bottom of the cam slot and continues there while the parts are in that position and in the position shown in Fig. 3, and while the stud $g$ remains at the bottom of the cam slot $h'$ the pinion frame $c$ is in a lowered position as shown in Fig. 7 and the reversing pinion is out of mesh with the driven spur wheel $f$.

When the lever $h$ is shifted from position shown in Fig. 1 to that shown in Fig. 3, the driving pinion $b$ is moved out of mesh with the driven spur wheel $f$, as shown in Fig. 4, but the stud $g$ continues at the bottom of the cam slot $h'$ and the pinion frame $c$ remains in a lowered position with the reversing pinion out of mesh with the driven spur wheel.

The driving and reversing pinions and the pinion frame $c$ are then at their limit of movement in the direction indicated by arrow in Fig. 3, but the shift lever owing to its spring connection with the pinion frame $c$ can continue its movement slightly farther.

The continued movement of the shift lever $h$ in the direction indicated by arrow shown in Fig. 3, fails to move the driving and reversing pinions and the pinion frame $c$ farther in that direction but the spring $h''$ permits of the movement of the shift lever $h$ independently of these parts, into the position shown in Fig. 5, and during this movement of the shift lever, the stud $g$ rides upwardly in the cam slot $h'$ and moves the pinion frame $c$, and reversing pinion $d$ to rotate around the axis of the driving pinion until the reversing pinion $d$ comes into mesh with the driven spur wheel $f$, the driving pinion $b$ however continuing out of mesh, as shown in Figs. 5 and 6, with the driven spur wheel as when in positions shown in Figs. 3 and 4.

When the shift lever $h$ is reversed, the parts move back from the position shown in Figs. 5 and 6 to that shown in Figs. 3 and 4, this movement first bringing the driving and reversing pinions to the neutral position shown in Figs. 3 and 4, and the continued movement of the shift lever in the reverse direction beyond the position shown in Figs. 3 and 4, then bringing the driving pinion into mesh with the driven spur wheel as shown in Figs. 1 and 2.

Having thus fully described my invention, what I claim as new and desire to secure by Letters Patent is:

1. A driving gear comprising a driving shaft, a pinion frame loosely mounted on, and movable axially of the driving shaft, a driving pinion mounted on the driving shaft to rotate therewith and move axially thereof during the movement of said pinion frame, a reversing pinion, rotatably mounted in said pinion frame, continuously in mesh with the driving pinion, a spur wheel mounted to mesh with the driving pinion, and a shift lever for moving said pinion frame axially of the shaft to bring the driving pinion into and out of mesh with the spur wheel, and a cam carried by said lever for positioning the pinion frame to bring the reversing pinion into mesh with the spur wheel when the driving pinion and spur wheel are out of mesh.

2. A driving gear comprising a driving shaft, a pinion frame loosely mounted on, and movable axially of, the driving shaft, a driving pinion mounted on the driving shaft, to rotate therewith and move axially thereof during the movement of said pinion frame, a reversing pinion, rotatably mounted in said pinion frame continuously in mesh with the driving pinion, a spur wheel mounted to mesh with the driving pinion, a shift lever for moving said pinion frame axially of the shaft to bring the driving pinion into and out of mesh with the spur wheel, a cam carried by said lever for positioning the pinion frame to bring the reversing pinion into mesh with the spur wheel when the driving pinion and spur wheel are out of mesh, and a spring connection between the lever and pinion frame to cause the united movement of the lever and pinion frame when the driving pinion is moving to a neutral position and to permit of the continued movement of the shift lever when the axial movement of the pinion frame and driving pinion have been arrested at the neutral position of the driving pinion.

3. A driving gear comprising a driving shaft, a driving pinion mounted on the driving shaft to rotate therewith and move axially thereof, a spur wheel with which the driving pinion is brought into and out of mesh, a movable reversing pinion mounted in a rotatable pinion frame and continuously in mesh with the driving pinion but normally out of mesh with the spur wheel, and means actuating the pinion frame to bring the reversing pinion into mesh with the spur wheel when the driving pinion is out of mesh with it.

4. A driving gear comprising a driven gear wheel, a pair of axially movable pinions with faces each greater than the width of the gear wheel and in such position that only one part of the face of each pinion is engaged with the other and means holding these pinions in their correct relative position, while, together, they take up the different positions necessary to drive the gear wheel, one of the pinions being movable around the axis of the other to engage with and disengage from the gear wheel.

Fergus, Ontario, November 26th, 1918.

WILLIAM G. BEATTY.

Signed in the presence of—
R. D. KERR,
J. B. LINDALE.

Copies of this patent may be obtained for five cents each, by addressing the "Commissioner of Patents, Washington, D. C."